(12) United States Patent
Hayasaka et al.

(10) Patent No.: US 11,325,356 B2
(45) Date of Patent: May 10, 2022

(54) METHOD FOR PRODUCING LAMINATE

(71) Applicant: ZEON CORPORATION, Tokyo (JP)

(72) Inventors: Kentaro Hayasaka, Tokyo (JP);
Tomoya Taniyama, Tokyo (JP); Shinji Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 180 days.

(21) Appl. No.: 16/337,104

(22) PCT Filed: Sep. 19, 2017

(86) PCT No.: PCT/JP2017/033714
§ 371 (c)(1),
(2) Date: Mar. 27, 2019

(87) PCT Pub. No.: WO2018/061868
PCT Pub. Date: Apr. 5, 2018

(65) Prior Publication Data
US 2020/0031100 A1    Jan. 30, 2020

(30) Foreign Application Priority Data
Sep. 30, 2016    (JP) .............................. JP2016-193427

(51) Int. Cl.
B32B 25/10    (2006.01)
A41D 19/00    (2006.01)
C08K 3/24    (2006.01)
C08K 5/09    (2006.01)
(Continued)

(52) U.S. Cl.
CPC .......... B32B 25/10 (2013.01); A41D 19/0055 (2013.01); B05D 5/00 (2013.01);
(Continued)

(58) Field of Classification Search
None
See application file for complete search history.

(56) References Cited

U.S. PATENT DOCUMENTS

2011/0099689 A1*  5/2011  Taylor .................... D06N 3/183
                                                                  2/167
2013/0152273 A1   6/2013  Hassan et al.
(Continued)

FOREIGN PATENT DOCUMENTS

JP    2014-111853 A    6/2014

OTHER PUBLICATIONS

Apr. 2, 2019 International Preliminary Report on Patentability issued in International Patent Application No. PCT/JP2017/033714.
(Continued)

Primary Examiner — James M Mellott
(74) Attorney, Agent, or Firm — Oliff PLC

(57) ABSTRACT

A method of producing a laminated body, the method including a coagulant solution deposition step of depositing a coagulant solution on a fiber substrate, and a coagulation step of forming a polymer layer on the fiber substrate by bringing a polymer latex into contact with the fiber substrate having the coagulant solution deposited thereon to cause a polymer to coagulate. As the coagulant solution, a solution obtained by dissolving or dispersing 0.2 to 7.0% by weight of a metal salt as a coagulant and 0.1 to 7.0% by weight of an organic acid in a solvent is used. In the method of producing a laminated body, the metal salt is a polyvalent metal salt. In the method of producing a laminated body, the organic acid is an organic acid having at least one group selected from a carboxyl group, a sulfo group, a hydroxy group, and a thiol group.

5 Claims, 1 Drawing Sheet

(51) Int. Cl.
    *C08L 9/04* (2006.01)
    *B05D 5/00* (2006.01)
    *C08K 3/28* (2006.01)
    *B05D 1/36* (2006.01)

(52) U.S. Cl.
    CPC .......... *C08K 3/24* (2013.01); *C08K 5/09* (2013.01); *C08L 9/04* (2013.01); *B05D 1/36* (2013.01); *B32B 2260/021* (2013.01); *B32B 2260/048* (2013.01); *B32B 2319/00* (2013.01); *B32B 2377/00* (2013.01); *C08K 2003/287* (2013.01)

(56)         References Cited

U.S. PATENT DOCUMENTS

| 2014/0115751 A1* | 5/2014 | Saito .......... A41D 19/0065 2/168 |
| 2015/0135403 A1 | 5/2015 | Mercado et al. |
| 2015/0143608 A1 | 5/2015 | Loo et al. |
| 2016/0262469 A1 | 9/2016 | Fernando et al. |

OTHER PUBLICATIONS

Apr. 15, 2020 Extended European Search Report issued in European Patent Application No. 17855823.5.
Dec. 5, 2017, International Search Report issued in International Patent Application No. PCT/JP2017/033714.
Dec. 21, 2021 Office Action issued in European Application No. 17 855 823.5.

* cited by examiner

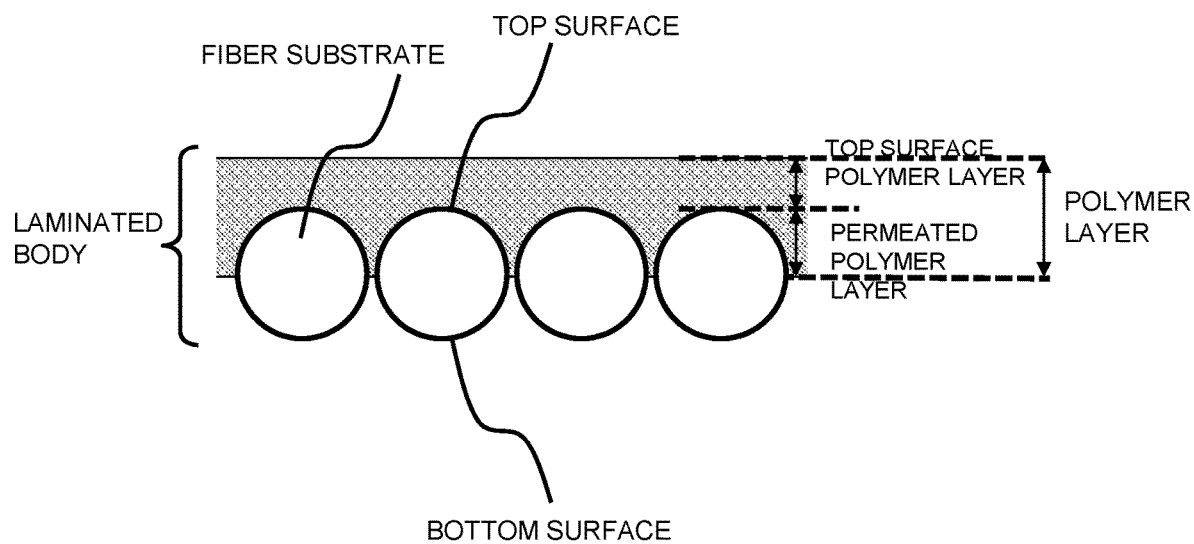

METHOD FOR PRODUCING LAMINATE

TECHNICAL FIELD

The present invention relates to a method of producing a laminated body composed of a polymer layer formed on a fiber substrate. The present invention also relates to a method of producing a protective glove using the laminated body.

BACKGROUND ART

Conventionally, protective gloves whose solvent resistance, grip properties, wear resistance, and the like have been improved by coating fiber gloves with rubber, resin, or the like have been used as work gloves in various applications, such as manufacturing work in factories, light work, construction work, and agricultural work.

For example, Patent Document 1 discloses a protective glove in which an elastic yarn is knitted at least in a wrist portion and the elastic yarn is coated with rubber or resin. However, a protective glove obtained by the technique of Patent Document 1 has a problem in that its flexibility when used as a work glove is not sufficient due to the influence of the rubber or resin used for coating the elastic yarn.

RELATED ART

Patent Document

Patent Document 1: Japanese Patent Laid-Open No. 2014-111853

SUMMARY OF THE INVENTION

Problem to be Solved by the Invention

The present invention has been made in view of such circumstances, and it is an object thereof to provide a method of producing a laminated body having excellent flexibility and wear resistance. Further, it is also an object of the present invention to provide a method of producing a protective glove using the laminated body obtained by such a production method.

Means for Solving the Problem

As a result of diligent research to achieve the above objects, the present inventors have found that the above objects can be achieved by, when producing a laminated body by bringing a polymer latex into contact with a fiber substrate to cause a polymer to coagulate and form a polymer layer, as a coagulant solution for coagulating the polymer of the polymer latex, using a solution obtained by dissolving or dispersing a metal salt as a coagulant and an organic acid in a predetermined ratio in a solvent, thereby completing the present invention.

Specifically, according to the present invention, there is provided a method of producing a laminated body, the method comprising a coagulant solution deposition step of depositing a coagulant solution on a fiber substrate, and a coagulation step of forming a polymer layer on the fiber substrate by bringing a polymer latex into contact with the fiber substrate having the coagulant solution deposited thereon to cause a polymer to coagulate. As the coagulant solution, a solution obtained by dissolving or dispersing 0.2 to 7.0% by weight of a metal salt as a coagulant and 0.1 to 7.0% by weight of an organic acid in a solvent is used.

In the method of producing a laminated body according to the present invention, the metal salt is preferably a polyvalent metal salt.

In the method of producing a laminated body according to the present invention, the organic acid is preferably an organic acid having at least one group selected from a carboxyl group, a sulfo group, a hydroxy group, and a thiol group.

In the method of producing a laminated body according to the present invention, a polymer constituting the polymer latex is preferably a nitrile rubber.

Further, according to the present invention, there is provided a method of producing a protective glove using a laminated body obtained by the above-mentioned production methods.

Effects of Invention

According to the present invention, a method of producing a laminated body having excellent flexibility and wear resistance can be provided. Further, according to the present invention, a method of producing a protective glove using the laminated body obtained by such a production method can be provided.

BRIEF DESCRIPTION OF DRAWING

FIG. 1 is a cross-sectional view of a laminated body composed of a polymer layer formed on a fiber substrate.

DESCRIPTION OF EMBODIMENTS

A method of producing a laminated body of the present invention comprises a coagulant solution deposition step of depositing a coagulant solution on a fiber substrate, and a coagulation step of forming a polymer layer on the fiber substrate by bringing a polymer latex into contact with the fiber substrate having the coagulant solution deposited thereon to cause the polymer to coagulate. As the coagulant solution, a solution obtained by dissolving or dispersing 0.2 to 7.0% by weight of a metal salt as a coagulant and 0.1 to 7.0% by weight of an organic acid in a solvent is used.

The fiber substrate used in the present invention is not particularly limited as long as it is made of fibers. Examples the fibers that may be used as a raw material include, but are not particularly limited to, natural fibers such as cotton, hair, hemp, and wool, synthetic fibers such as polyester, polyurethane, acrylic, and nylon, and the like. Among these, it is preferable to use nylon. Further, the fiber substrate may be woven or sewn, or may be a woven fabric or a nonwoven fabric.

The thickness of the fiber substrate is not particularly limited, but is preferably 0.1 to 2.0 mm. The linear density of the fiber substrate is not particularly limited, but is preferably 50 to 500 denier. The gauge number of the fiber substrate is not particularly limited, but is preferably 7 to 18 gauge. Here, the gauge number refers to the number of needles in the knitting machine per 1 inch.

Note that, since the fiber substrate is composed of a plurality of fibers, particularly in the case where the fiber substrate is a woven fabric, there exist, in general, portions where the fibers are folded and the overlapping degree of the fibers in the thickness direction is dense (portion where the number of overlapping fibers is large) and portions where the overlapping degree of the fibers in the thickness direction is sparse (portion where the number of overlapping fibers is small), and hence the fiber substrate is composed of a layer (substrate layer) including these portions. Therefore, in the microstructure of the fiber substrate, the thickness may be different in the portions where the overlapping degree of the fibers is dense and the portions where the overlapping degree of the fibers is sparse. However, the thickness of the fiber substrate is determined as the average value when the thickness of the portion where the overlapping degree of the fibers is dense is regarded as the thickness of the fiber substrate.

The coagulant solution used in the present invention is obtained by dissolving or dispersing 0.2 to 7.0% by weight of a metal salt as a coagulant and 0.1 to 7.0% by weight of an organic acid in a solvent.

The metal salt acting as a coagulant constituting the coagulant solution is not particularly limited as long as it is a metal salt capable of causing the polymer in the polymer latex to coagulate. Examples of the metal species include: monovalent metals such as lithium, sodium, and potassium; divalent metals such as magnesium, calcium, zinc, iron, barium, zirconium, and copper; and trivalent metals such as aluminum. Examples of the salt species include: inorganic acid salts such as nitrate, sulfate, and chloride; organic acid salts such as acetate; and the like. Among these, as the metal species, polyvalent metals are preferable, divalent metals are more preferable, and calcium is particularly preferable. As the salt species, nitrate or chloride is preferable, and nitrate is particularly preferable. In other words, the metal salt is preferably a polyvalent metal salt, and more preferably a divalent metal nitrate or a halogenated salt.

Specific examples of these metal salts include: nitrates such as calcium nitrate, barium nitrate, and zinc nitrate; metal halide salts such as barium chloride, calcium chloride, magnesium chloride, zinc chloride, and aluminum chloride; acetates such as barium acetate, calcium acetate, and zinc acetate; sulfates such as calcium sulfate, magnesium sulfate, and aluminum sulfate; and the like. Among these, nitrates and metal halide salts are preferable, calcium nitrate and calcium chloride are more preferable, and calcium nitrate is particularly preferable.

These metal salts can be used singly or in combinations of two or more.

The organic acid constituting the coagulant solution is not particularly limited, but is preferably an organic acid having at least one group selected from a carboxyl group, a sulfo group, a hydroxy group, and a thiol group. Specific examples include acetic acid, formic acid, propionic acid, citric acid, oxalic acid, ascorbic acid, malic acid, tartaric acid, benzoic acid, lactic acid, gluconic acid, succinic acid, fumaric acid, alkylbenzene sulfonic acid, aliphatic sulfonic acid, dodecyl diphenyl ether sulfonic acid, and the like. Among these, organic acids having a carboxyl group, such as acetic acid, formic acid, propionic acid, citric acid, and oxalic acid are preferable, and acetic acid is more preferable.

The solvent for dissolving or dispersing the metal salt as a coagulant and the organic acid is not particularly limited, but water, an alcohol such as methanol and ethanol, or a mixture thereof, and the like can be used. Among these, an alcohol is preferable, and methanol is particularly preferable.

The concentration of the metal salt as a coagulant in the coagulant solution is 0.2 to 7.0% by weight, preferably 0.2 to 6.0% by weight, more preferably 0.2 to 4.0% by weight, and even more preferably 0.2 to 2.0% by weight. The concentration of the organic acid in the coagulant solution is 0.2 to 7.0% by weight, preferably 0.2 to 5.0% by weight, and more preferably 0.2 to 3.0% by weight.

Further, in the production method of the present invention, by depositing such a coagulant solution on a fiber substrate and bringing a polymer latex into contact with the fiber substrate having the coagulant solution deposited thereon, the polymer is caused to coagulate, thereby forming a polymer layer on the fiber substrate.

Specifically, in the production method of the present invention, the above-mentioned coagulant solution is deposited on a fiber substrate, and a polymer latex is brought into contact with the obtained fiber substrate on which the coagulant solution was deposited. As a result, coagulation of the polymer in the polymer latex proceeds while a portion of the polymer latex permeates into an interior portion of the fiber substrate, thereby forming a polymer layer. Therefore, as shown in FIG. 1, the laminated body obtained by the production method of the present invention has a structure in which a polymer layer is formed on a top surface of the fiber substrate and a portion of the polymer layer has permeated as far as gaps in the fibers constituting the fiber substrate. Note that FIG. 1 is a diagram showing a cross-sectional view of a laminated body obtained by the production method of the present invention. In FIG. 1, the permeated polymer layer is defined as the portion of the polymer layer having permeated into the gaps of the fiber substrate. Further, the portion formed on the top surface of the fiber substrate in the polymer layer is shown as the top surface polymer layer. Further, in FIG. 1, a cross-section of the fiber substrate is shown in a simple manner for the sake of clarity, but the cross-section of the actual fiber substrate is not limited to such a shape. In FIG. 1, the fibers constituting the fiber substrate are illustrated as being arranged so as to be one layer in the direction perpendicular to the paper surface, but the fibers constituting the fiber substrate may also be folded over and arranged in two or more layers. The fibers constituting the fiber substrate may be single fibers (individual fibers extracted one by one from the above-mentioned natural fibers, synthetic fibers, or the like), or a twisted yarn composed of a plurality of single fibers. Note that, in the present invention, the polymer layer is described as being composed of a permeated polymer layer and a top surface polymer layer as appropriate, but in general, the permeated polymer layer and top surface polymer layer are formed as one body.

Further, according to the present invention, as described above, the coagulant solution for coagulating the polymer of the polymer latex is a coagulant solution that contains a metal salt as a coagulant and an organic acid, and that contains the metal salt as a coagulant and an organic acid in a predetermined content ratio is used. As a result, a polymer layer having a certain thickness can be formed on the top surface of the fiber substrate, and, a portion of the polymer layer can permeate the fiber substrate to a suitable thickness. This enables an excellent balance between the flexibility and wear resistance of the obtained laminated body, and as a result, the laminated body can be suitably used as a protective glove, such as a work glove, for example.

In other words, in the present invention, when the polymer latex is brought into contact with the fiber substrate on which a coagulant solution has been deposited, the coagulation rate of the polymer in the polymer latex due to the action of the metal salt as a coagulant in the coagulant solution can be appropriately adjusted by the action of the organic acid in the solution. This enables the coagulation of the polymer to proceed while appropriately allowing the polymer latex to permeate into the fiber substrate, so that, as shown in FIG. 1, a polymer layer having a certain thickness can be formed on the top surface of the fiber substrate, and a portion of that polymer layer can permeate into the fiber substrate. As a result, the thickness of the permeated polymer layer and the thickness of the top surface polymer layer are each a suitable thickness, so that when the obtained laminated body is used as a protective glove, such as a work glove, the glove has excellent flexibility and wear resistance.

In particular, according to the present invention, even when the content ratio of the metal salt as a coagulant in the coagulant solution is increased (e.g., even when the content ratio of the metal salt as a coagulant in the coagulant solution is set to be more than 0.5% by weight), due to the action of the organic acid in the coagulant solution, a portion of the polymer layer can appropriately permeate into the fiber substrate. As a result, in the obtained laminated body, peeling of the polymer layer can be effectively prevented by the action of the portion of the polymer layer having permeated into the fiber substrate, thereby enabling the wear resistance of the laminated body to be particularly improved.

If the content ratio of the metal salt as a coagulant in the coagulant solution is too large, the coagulation rate of the polymer in the polymer latex increases and coagulation of the polymer proceeds before the polymer latex sufficiently permeates into the fiber substrate. As a result, of the formed polymer layer, the thickness of the top surface polymer layer formed on the top surface of the fiber substrate to become too thick, which not only causes the flexibility of the obtained laminated body to deteriorate, but also causes, of the formed polymer layer, the thickness of the permeated polymer layer formed through permeation into the fiber substrate to become too thin. As a result, the polymer layer tends to peel off from the fiber substrate, causing the wear resistance of the laminated body to deteriorate. On the other hand, if the content ratio of the metal salt as a coagulant in the coagulant solution is too small, the coagulation rate of the polymer in the polymer latex decreases, and the polymer latex permeates excessively far into the fiber substrate. As a result, the polymer layer passes right through to the bottom surface of the fiber substrate, which causes the productivity of the laminated body to deteriorate, and an uncomfortable feeling when the obtained laminated body is used as a protective glove.

If the content ratio of the organic acid in the coagulant solution is too small, the coagulation rate of the polymer in the polymer latex decreases and the polymer latex permeates too far into the fiber substrate. As a result, the polymer layer passes right through to the bottom surface of the fiber substrate, which causes the productivity of the laminated body to deteriorate, and an uncomfortable feeling when the obtained laminated body is used as a protective glove. On the other hand, if the content ratio of the organic acid in the coagulant solution is too large, the coagulation rate of the polymer in the polymer latex increases and coagulation of the polymer proceeds before the polymer latex sufficiently permeates into the fiber substrate. As a result, of the formed polymer layer, the thickness of the top surface polymer layer formed on the top surface of the fiber substrate becomes too thick, which not only causes the flexibility of the obtained laminated body to deteriorate, but also causes, of the formed polymer layer, the thickness of the permeated polymer layer formed through permeation into the fiber substrate to become too thin. As a result, the polymer layer tends to peel off from the fiber substrate, causing the wear resistance of the laminated body to deteriorate.

The polymer latex used in the production method of the present invention is not particularly limited, but from the viewpoint that the obtained laminated body can have superior flexibility, it is preferable to use a polymer containing a rubbery polymer. Examples of the rubbery polymer include: natural rubber; a conjugated diene type rubber obtained by polymerizing or copolymerizing a conjugated diene, such as butadiene or isoprene; and the like. Among these, a conjugated diene type rubber is preferable. Examples of conjugated diene rubbers include a so-called nitrile rubber obtained by copolymerizing nitrile, isoprene rubber, styrene-butadiene rubber, chloroprene rubber, and the like, among which a nitrile rubber is particularly preferable.

The nitrile rubber is not particularly limited, but a copolymer obtained by copolymerizing an $\alpha,\beta$-ethylenically unsaturated nitrile monomer and the other optionally-used copolymerizable monomer can be used.

The $\alpha,\beta$-ethylenically unsaturated nitrile monomer is not particularly limited, but an ethylenically unsaturated compound having a nitrile group and preferably 3 to 18 carbon atoms can be used. Examples of such an $\alpha,\beta$-ethylenically unsaturated nitrile monomer include acrylonitrile, methacrylonitrile, a halogen-substituted acrylonitrile, and the like. Among these, acrylonitrile is particularly preferable. Note that, these $\alpha,\beta$-ethylenically unsaturated nitrile monomers may be used singly or in combinations of two or more.

The content ratio of the $\alpha,\beta$-ethylenically unsaturated nitrile monomer unit in the nitrile rubber is preferably 10 to 45% by weight, and more preferably 20 to 40% by weight, based on all monomer units. When the content ratio of the $\alpha,\beta$-ethylenically unsaturated nitrile monomer unit is in the above range, the solvent resistance of the obtained laminated body can be improved and texture can be improved.

Further, from the viewpoint of imparting rubber elasticity to the obtained polymer layer, the nitrile rubber preferably contains a conjugated diene monomer unit.

The conjugated diene monomer forming the conjugated diene monomer unit is preferably a conjugated diene monomer having 4 to 6 carbon atoms, such as 1,3-butadiene, isoprene, 2,3-dimethyl-1,3-butadiene, 1,3-pentadiene, and chloroprene; 1,3-butadiene and isoprene are more preferable; and 1,3-butadiene is particularly preferable. These conjugated diene monomers may be used singly or in combinations of two or more.

The content ratio of the conjugated diene monomer unit is preferably 40 to 80% by weight, and more preferably 52 to 78% by weight, based on all monomer units constituting the nitrile rubber. When the content ratio of the conjugated diene monomer unit is in the above range, the solvent resistance of the obtained laminated body can be improved and the texture of the obtained laminated body when used as a protective glove can be improved.

Further, the nitrile rubber may include a monomer forming an $\alpha,\beta$-ethylenically unsaturated nitrile monomer unit and the other ethylenically unsaturated acid monomers copolymerizable with a monomer forming a conjugated diene monomer unit.

Examples of such other copolymerizable ethylenically unsaturated acid monomers include, but are not particularly limited to, a carboxyl group-containing ethylenically unsaturated monomer, a sulfonic acid group-containing ethylenically unsaturated monomer, a phosphoric acid group-containing ethylenically unsaturated monomer, and the like.

Examples of the carboxyl group-containing ethylenically unsaturated monomer include, but are not particularly limited to, ethylenically unsaturated monocarboxylic acids such as acrylic acid, methacrylic acid, and crotonic acid; ethylenically unsaturated polyvalent carboxylic acids, and anhydrides thereof, such as fumaric acid, maleic acid, itaconic acid, maleic anhydride, itaconic anhydride; partially esterified products of ethylenically unsaturated polyvalent carboxylic acids, such as methyl maleate and methyl itaconate; and the like.

Examples of the sulfonic acid group-containing ethylenically unsaturated monomer include, but are not particularly limited to, vinylsulfonic acid, methylvinylsulfonic acid, styrenesulfonic acid, (meth)allylsulfonic acid, ethyl (meth) acrylate-2-sulfonate, 2-acrylamide-2-hydroxypropanesulfonic acid, and the like.

Examples of the phosphoric acid group-containing ethylenically unsaturated monomer include, but are not particularly limited to, propyl (meth)acrylate-3-chloro-2-phosphate, ethyl (meth)acrylate-2-phosphate, 3-allyloxy-2-hydroxypropane phosphoric acid, and the like.

These other copolymerizable ethylenically unsaturated acid monomers may be used as alkali metal salt or an ammonium salt, and may be used singly or in combinations of two or more. Among the other copolymerizable ethylenically unsaturated acid monomers, a carboxyl group-containing ethylenically unsaturated monomer is preferable, an ethylenically unsaturated monocarboxylic acid is more preferable, and methacrylic acid is particularly preferable.

The content of the other copolymerizable ethylenically unsaturated acid monomer in the polymer constituting the polymer latex used in the present invention is preferably 2 to 8% by weight based on all monomer units in the polymer. Setting the content of the other copolymerizable ethylenically unsaturated acid monomer unit to be in the above range enables the moldability of the polymer layer to be formed on the fiber substrate to be superior, and the texture when the obtained laminated body is used as a protective glove can be improved.

In addition to the above-mentioned ethylenically unsaturated nitrile monomer unit, conjugated diene monomer unit, and the other copolymerizable ethylenically unsaturated acid monomer unit, the polymer constituting the polymer latex may further contain other monomer unit.

Other monomers forming the other monomer unit may be any monomer that is copolymerizable with the conjugated diene monomer, the ethylenically unsaturated nitrile monomer unit, and the ethylenically unsaturated acid monomer. Examples thereof include, but are not particularly limited to, the following monomers.

Specifically, examples of the other monomer may include: aromatic vinyl monomers such as styrene, α-methylstyrene, monochlorostyrene, dichlorostyrene, trichlorostyrene, monomethylstyrene, dimethylstyrene, trimethylstyrene, and hydroxymethylstyrene; ethylenically unsaturated carboxylic acid amide monomers such as acrylamide, methacrylamide, N,N-dimethylacrylamide, and N-methylolacrylamide; ethylenically unsaturated carboxylic acid alkyl ester monomers such as methyl (meth)acrylate, ethyl (meth)acrylate, butyl (meth)acrylate, and 2-ethylhexyl (meth)acrylate; carboxylic acid vinyl ester monomers such as vinyl acetate, vinyl propionate, and vinyl versatate; halogenated vinyl monomers such as vinyl chloride, vinylidene chloride, vinyl fluoride, and vinylidene fluoride; olefin monomers such as ethylene, propylene, 1-butene, and isobutene; vinyl ether monomers such as methyl vinyl ether, n-propyl vinyl ether, isobutyl vinyl ether, and dodecyl vinyl ether; (meth)allyl compounds such as allyl acetate, methallyl acetate, allyl chloride, and methallyl chloride; vinylsilyl compounds such as vinyltrimethoxysilane; vinyl pyridine, N-vinyl pyrrolidone; and the like. Among these, from the viewpoint that the strength of the obtained laminated body can be further increased, aromatic vinyl monomers are preferable. These other monomers may be used singly or in combinations of two or more.

The content of other monomer unit in the polymer constituting the polymer latex is, from the viewpoint of preventing the polymer layer from peeling off from the fiber substrate, from the viewpoint of suppressing work fatigue when used as a work glove, and from the viewpoint of suppressing passage of solvent gas when worn as a work glove, preferably 26% by weight or less, more preferably 10% by weight or less, even more preferably 7% by weight or less, and particularly preferably 5% by weight or less, based on all monomer units in the polymer.

The polymer latex used in the present invention is not particularly limited, and may, for example, be any latex of a polymer obtained by polymerizing a monomer mixture containing the above-mentioned monomers. This polymer latex may be a latex obtained by emulsion polymerization of the above-mentioned monomer mixture, a latex obtained by phase inversion emulsification of a polymer solution obtained by solution polymerization of the above-mentioned monomer mixture, and the like.

In the case of using a latex obtained by emulsion polymerization, by adjusting the composition of the monomer mixture used for the emulsion polymerization, the composition of the obtained copolymer can be easily adjusted. A conventionally known method can be employed as the emulsion polymerization method.

For the emulsion polymerization of the above mixture of monomers, ordinarily used polymerization auxiliary materials, such as an emulsifier, a polymerization initiator, and a molecular weight regulator, can be used. The method of adding these polymerization auxiliary materials is not particularly limited, and any method, such as an initial batch addition method, a split addition method, and a continuous addition method may be used.

Examples of emulsifiers include, but are not limited to, anionic surfactants, nonionic surfactants, cationic surfactants, amphoteric surfactants, and the like. Among these, anionic surfactants such as alkylbenzene sulfonate, an aliphatic sulfonate, a sulfuric acid ester salt of a higher alcohol, an α-olefin sulfonate, and an alkyl ether sulfuric acid ester salt are preferable.

The used amount of the emulsifier is preferably 0.5 to 10 parts by weight, and more preferably 1 to 8 parts by weight, based on 100 parts by weight of all monomers used.

The polymerization initiator is not particularly limited, but a radical initiator is preferable. Examples of the radical initiator include, but are not particularly limited to: inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyrylperoxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexane carbonitrile, and methyl azobisisobutyrate; and the like. Among these, an inorganic peroxide or an organic peroxide is preferable, an inorganic peroxide is more preferable, and persulfate is particularly preferable. These polymerization initiators may be used singly or in combinations of two or more.

The used amount of the polymerization initiator is preferably 0.01 to 2 parts by weight, and more preferably 0.05 to 1.5 parts by weight, based on 100 parts by weight of all monomers used.

Examples of the molecular weight regulator include, but are not limited to, an α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropylxanthogen disulfide; and the like. Among these, mercaptans are preferable, and t-dodecylmercaptan is more preferable. These molecular weight regulators may be used singly or in combinations of two or more.

Although the used amount of the molecular weight regulator depends on the kind of molecular weight regulator, it is preferably 0.1 to 1.5 parts by weight, and more preferably 0.2 to 1.0 part by weight, based on 100 parts by weight of all monomers to be used.

Emulsion polymerization is usually carried out in water. The used amount of the water is preferably 80 to 500 parts by weight, and more preferably 100 to 200 parts by weight, based on 100 parts by weight of all monomers to be used.

During emulsion polymerization, optionally, a polymerization auxiliary material other than the above may be further used. Examples of the polymerization auxiliary material include a chelating agent, a dispersant, a pH regulator, a deoxidizing agent, a particle size adjusting agent, and the like. The kind and used amount of those polymerization auxiliary materials are not particularly limited.

Examples of the method of adding the monomers include a method of adding the monomers used in the reaction vessel at a time, a method of continuously or intermittently adding the monomers according to the progress of polymerization, a method in which the reaction is carried out up to a specific conversion rate by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed.

Further, each monomer may be added to the reaction vessel after mixing in advance the various monomers to be used, or may be individually added to the reaction vessel.

The polymerization temperature during emulsion polymerization is not particularly limited, but it is usually 0 to 95° C., and preferably 5 to 70° C. The polymerization time is not particularly limited, but is usually about 5 to 40 hours.

As described above, at the point when the monomers have undergone emulsion polymerization and a predetermined polymerization conversion rate has been reached, the polymerization reaction is stopped by cooling the polymerization system or by adding a polymerization terminator. The polymerization conversion rate at the time of stopping the polymerization reaction is usually 80% by weight or more, and preferably 90% by weight or more.

The polymerization terminator is not particularly limited as long as it is usually used in emulsion polymerization. Specific examples thereof include hydroxyamine compounds such as hydroxylamine, hydroxyamine sulfate, diethylhydroxyamine, and hydroxyamine sulfonic acid and alkali metal salts thereof; sodium dimethyldithiocarbamate; hydroquinone derivatives; catechol derivatives; aromatic hydroxy dithiocarboxylic acids such as hydroxydimethyl benzene thiocarboxylic acid, hydroxydiethyl benzene dithiocarboxylic acid, and hydroxydibutyl benzene dithiocarboxylic acid, and alkali metal salts thereof; and the like.

The used amount of the polymerization terminator is not particularly limited, but is usually 0.05 to 2 parts by weight based on 100 parts by weight of all monomers to be used.

After stopping the polymerization reaction, if desired, unreacted monomers may be removed, and the solid content concentration and pH may be adjusted.

The weight average particle size of the particles of the polymer constituting the polymer latex is usually 30 to 1000 nm, preferably 50 to 500 nm, and more preferably 70 to 200 nm. When the weight average particle size of the particles of the polymer is in the above range, the viscosity of the polymer latex is appropriate, the handleability of the polymer latex improves, and moldability during molding the polymer layer improves, whereby a laminated body having a uniform polymer layer is obtained.

The solid content concentration of the polymer latex is usually 20 to 65% by weight, preferably 30 to 60% by weight, and more preferably 35 to 55% by weight. By setting the solid content concentration of the polymer latex to be in the above range, the transport efficiency of the latex can be improved, the viscosity of the polymer latex is appropriate, and the handleability of the polymer latex is improved.

The pH of the polymer latex is usually 5 to 13, preferably 7 to 10, and more preferably 7.5 to 9. By setting the pH of the polymer latex to be in the above range, mechanical stability is improved, the occurrence of coarse aggregates during transfer of the polymer latex can be suppressed, the viscosity of the polymer latex is appropriate, and the handleability of polymer latex improves.

Further, in the polymer latex used in the present invention, a crosslinking agent, a crosslinking accelerator, zinc oxide, a viscosity modifier, and the like can be added. Specifically, the polymer latex used in the present invention may be a composition (latex composition) to which these components have been added. The same applies in the following description of the polymer latex even when a latex composition is used as the polymer latex.

As the crosslinking agent, it is preferable to use a sulfur crosslinking agent. Examples of sulfur crosslinking agents include, but are not particularly limited to: sulfur, such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzo thiazyl disulfide, caprolactam disulfide, phosphorus-containing polysulfide, and polymer polysulfide; sulfur donating compounds such as tetramethyl thiuram disulfide, selenium dimethyl dithiocarbamate, and 2-(4'-morpholino-dithio)benzothiazole; and the like. These crosslinking agents may be used singly or in combinations of two or more.

The used amount of the sulfur crosslinking agent is preferably 0.01 to 5 parts by weight, more preferably 0.05 to 3 parts by weight, and particularly preferably 0.1 to 2 parts by weight, based on 100 parts by weight of the total solid content in the polymer latex. By setting the added amount of the sulfur crosslinking agent to be in the above range, the solvent resistance of the obtained laminated body can be improved, and the texture of the obtained laminated body when used as a protective glove can be improved.

It is preferable to add the sulfur crosslinking agent as a dispersion in which the sulfur crosslinking agent is dispersed in a solvent. By adding to the polymer latex as a dispersion, a laminated body can be obtained that has few defects such as cracks, generation of pinholes, and adhered agglomerates in the obtained polymer layer.

The method of preparing the dispersion of the sulfur crosslinking agent is not particularly limited, but a method in which a solvent is added to the sulfur crosslinking agent and the resultant mixture is pulverized and stirred with a wet pulverizer, such as a ball mill or a bead mill, is preferable.

When sulfur is used as the sulfur crosslinking agent, it is preferable to use together with a crosslinking accelerator (vulcanization accelerator) or zinc oxide.

Examples of the crosslinking accelerator (vulcanization accelerator) include, but are not particularly limited to: dithiocarbamines and zinc salts thereof, such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid; 2-mercaptobenzothiazole, 2-mercaptobenzothiazole zinc, 2-mercaptothiazoline, dibenzothiazyl disulfide, 2-(2,4-dinitrophenylthio)benzothiazole, 2-(N,N-diethylthiocarbaylthio)benzothiazole, 2-(2,6-dimethyl-4-morpholinothio)benzothiazole, 2-(4'-morpholino-dithio)benzothiazole, 4-morpholinyl-2-benzothiazyl-disulfide, 1,3-bis(2-benzothiazyl-mercaptomethyl) urea, and the like. Among these, zinc diethyl dithiocarbamate, zinc dibutyl dithiocarbamate, 2-mercaptobenzothiazole, and zinc 2-mercaptobenzothiazole are preferable. These crosslinking accelerators may be used singly or in combinations of two or more.

The used amount of the crosslinking accelerator is preferably 0.1 to 10 parts by weight, and more preferably 0.5 to 5 parts by weight, based on 100 parts by weight of the total solid content in the polymer latex.

The used amount of zinc oxide is preferably 5 parts by weight or less, more preferably 0.1 to 3 parts by weight, and even more preferably 0.5 to 2 parts by weight, based on 100 parts by weight of the total solid content in the polymer latex.

In order to adjust the viscosity of the polymer latex to a desired range, it is preferable to add a viscosity modifier to the polymer latex. Examples of the viscosity modifier include, but are not particularly limited to, a carboxymethyl cellulose thickener, a polycarboxylic acid thickener, a polysaccharide thickener, and the like. Further, the viscosity of the polymer latex is preferably 500 to 8,000 mPa·s, and more preferably 2,500 to 7,000 mPa·s. In particular, when the polymer latex is used in a latex composition state (e.g., in a state where the above-mentioned crosslinking agent, crosslinking accelerator, zinc oxide, viscosity modifier, and the like are added to the polymer latex), it is preferable to set the viscosity of such a latex composition to be within the above range.

As described above, although a crosslinking agent, a crosslinking accelerator, zinc oxide, a viscosity modifier, and the like can be added to the polymer latex, optionally, a predetermined amount of various additives, such as an anti-aging agent, an antioxidant, a preservative, an antibacterial agent, a wetting agent, a thickener, a dispersant, a pigment, a dye, a filler, a reinforcing material, and a pH regulator, can also be added.

Although it is preferable to control the solid content concentration of a polymer latex in a state in which a crosslinking agent has not been added to within the above range, in the case of a polymer latex to which a crosslinking agent has been added (latex composition in which a crosslinking agent is added), the solid content concentration thereof is preferably 5 to 40% by weight, and more preferably 10 to 25% by weight. The surface tension of the polymer latex in which a crosslinking agent has been added (latex composition in which a crosslinking agent is added) is preferably 25 to 40 mN/m.

In the production method of the present invention, by first depositing the above-mentioned coagulant solution on the above-mentioned fiber substrate and then coagulating the polymer by bringing polymer latex into contact with the fiber substrate having the coagulant solution deposited thereon to thereby form a polymer layer on the fiber substrate, a laminated body composed of a fiber substrate and a polymer layer is obtained.

Examples of the method of depositing the coagulant solution on the fiber substrate include, but are not particularly limited to, a method of dipping the fiber substrate in the coagulant solution.

In the case of dipping the fiber substrate in the coagulant solution, the dipping time is not particularly limited, but is preferably 30 to 1 second, and more preferably 10 to 1 second.

Further, when the fiber substrate is deposited on the coagulant solution, it is preferable to dip the fiber substrate in the coagulant solution in a state in which the fiber substrate is covered with a molding die having a desired shape.

The mold for covering the fiber substrate is not particularly limited, but various materials may be used, such as porcelain, glass, metal, and plastic. As the shape of the molding die, a desired shape may be selected according to the shape of the final product. For example, when the laminated body is to be used as a protective glove, it is preferable to use a molding die for various gloves, such as a molding die having a shape from the wrist to the fingertip, as the molding die for covering the fiber substrate.

Further, in the production method of the present invention, it is preferable to remove the solvent included in the coagulant solution by drying the fiber substrate after the coagulant solution has been deposited on the fiber substrate. The drying temperature at this time is not particularly limited, and may be selected according to the solvent to be used, but is preferably 10 to 80° C., and more preferably 15 to 70° C. The drying time is not particularly limited, but is preferably 600 to 1 second, and more preferably 300 to 5 seconds.

Next, by bringing the polymer latex into contact with the fiber substrate having the coagulant solution deposited thereon in this way, the polymer in the polymer latex is caused coagulate, to thereby form a polymer layer on the fiber substrate.

Examples of the method of bringing the polymer latex into contact with the fiber substrate having the coagulant solution deposited thereon include, but are not particularly limited to, a method of dipping the fiber substrate having the coagulant solution deposited thereon in the polymer latex.

When dipping the fiber substrate having the coagulant solution deposited thereon in the polymer latex, it is preferable to dip the fiber substrate having the coagulant solution deposited thereon in the polymer latex in a state in which the fiber substrate is covered with a molding die having a desired shape. In this case, it is preferable to, in a state in which the fiber substrate has been covered in advance with a molding die having the desired shape, deposit the coagulant solution on the fiber substrate as described above, and then with the fiber substrate having the coagulant solution deposited thereon covered by the molding die, dip the fiber substrate in the polymer latex.

In the production method of the present invention, it is preferable to dry the fiber substrate having the coagulant solution deposited thereon after it is dipped in the polymer latex. Although the drying temperature at this time is not particularly limited, it is preferably 10 to 80° C., and more preferably 15 to 80° C. Further, the drying time is not particularly limited, but is preferably 120 minutes to 5 seconds, and more preferably 60 minutes to 10 seconds.

In the case of using a polymer latex in which a crosslinking agent has been added, a polymer latex aged in advance (also referred to as prevulcanized) may be used.

The temperature condition for the aging is not particularly limited, but is preferably 20 to 50° C. Further, from the viewpoint of preventing peeling between the fiber substrate and the polymer layer, from the viewpoint of improving wear resistance when the obtained laminated body is used as a protective glove, and from the viewpoint of suppressing passage of solvent gas in the case where the protective glove is used as a work glove, the aging time is preferably 4 hours or more and 120 hours or less, and more preferably 24 hours or more and 72 hours or less. By setting the aging time to within the above range, the polymer layer permeates into the fiber substrate to a suitable thickness, which prevents peeling between the fiber substrate and the polymer layer, improves the wear resistance of the obtained laminated body, and effectively suppresses passage of solvent gas when the laminated body is used as a protective glove.

Further, when using a polymer latex in which a crosslinking agent has been added, it is preferable to crosslink the polymer constituting the polymer latex by heating the polymer latex deposited on the fiber substrate after the fiber substrate having the coagulant solution deposited thereon is dipped in the polymer latex.

The heating temperature for crosslinking is preferably 60 to 160° C., and more preferably 80 to 150° C. By setting the heating temperature to within the above range, the productivity of the laminated body can be improved by shortening the time required for the crosslinking reaction, and the physical properties of the obtained laminated body can be improved by suppressing oxidative degradation of the polymer due to excessive heating. The heating time for crosslinking may be appropriately selected according to the heating temperature, and it is usually 5 to 120 minutes.

In the production method of the present invention, as described above, by bringing the polymer latex into contact with the fiber substrate having the coagulant solution deposited thereon, the polymer in the polymer latex coagulates while a portion of the polymer latex permeates into the fiber substrate. As a result, a polymer layer is formed on the fiber substrate, whereby a laminated body is obtained. Therefore, as shown in FIG. 1, a polymer layer is formed by a portion of the polymer of the polymer latex coagulating in a state in which it has permeated into the fiber substrate, and as a result, the obtained laminated body has excellent flexibility and wear resistance.

Note that in the production method of the present invention, after the polymer layer is formed on the fiber substrate, it is preferable to remove water-soluble impurities (emulsifier, water-soluble polymers, coagulant, and the like) from the polymer layer by dipping the polymer layer in warm water of 20 to 80° C. for about 0.5 to 60 minutes. In the case of using a polymer latex in which a crosslinking agent has been added (a latex composition in which a crosslinking agent is added), the treatment of dipping the polymer layer in warm water may be carried out after the polymer of the polymer layer has been crosslinked, but from the viewpoint of enabling water-soluble impurities to be removed more efficiently, it is preferable to carry out the dipping treatment before crosslinking the polymer of the polymer layer.

Further, when the polymer layer is formed in a state in which the fiber substrate had been covered with a molding die, the laminated body can be obtained by removing the fiber substrate on which the polymer layer is formed from the molding die. As the method of removing the laminated body from the molding die, a method of peeling the laminated body from the molding die by hand or by water pressure or compressed air can be employed.

After removing the laminated body from the molding die, a heat treatment (post-crosslinking step) for 10 to 120 minutes at a temperature of 60 to 120° C. may be further carried out. Further, a surface-treated layer may be formed on the inner side and/or outer side top surface of the laminated body by a chlorination treatment, a coating treatment, or the like.

For the laminated body obtained by the production method of the present invention, of the polymer substrate constituting the laminated body, the thickness of the permeated portion in the fiber substrate, that is, the thickness of the permeated polymer layer shown in FIG. 1, is not particularly limited, but is preferably 0.6 to 0.05 mm, more preferably 0.55 to 0.1 mm, and even more preferably 0.5 to 0.2 mm. By setting the thickness of the permeated polymer layer to be in the above range, wear resistance when the obtained laminated body is used as a protective glove is further improved. Note that, as shown in FIG. 1, the permeated polymer layer represents the permeated portion in the fiber substrate, so that the upper limit of the thickness is the thickness when the entire fiber substrate has been permeated, which is a value equal to the thickness of the fiber substrate itself. For example, when a fiber substrate having a thickness of 0.6 mm is used, the upper limit of the thickness of the permeated polymer layer (the thickness of the permeated polymer layer when the polymer layer permeates the entire fiber substrate) is 0.6 mm.

Further, in the laminated body obtained by the production method of the present invention, of the polymer layer, the thickness of the portion having not permeated into the fiber substrate, that is, the thickness of the top surface polymer layer shown in FIG. 1, is not particularly limited, but is preferably 0.6 to 0.05 mm, more preferably 0.5 to 0.1 mm, and even more preferably 0.45 to 0.12 mm. By setting the thickness of the top surface polymer layer to be in the above range, in the case of using the obtained laminated body as a protective glove, flexibility is further improved.

The ratio between the thickness of the permeated polymer layer and the thickness of the top surface polymer layer in the polymer layer is not particularly limited. When expressed as the ratio of the thickness of the permeated polymer layer to the thickness of the top surface polymer layer (thickness of permeated polymer layer/thickness of top surface polymer layer), this ratio is preferably 5 to 0.2, and more preferably 2 to 0.3. When the ratio of the thickness of the permeated polymer layer to the thickness of the top surface polymer layer is in the above range, an excellent balance between flexibility and wear resistance can be achieved when the obtained laminated body is used as a protective glove.

The entire thickness of the polymer layer, that is, the total of the thickness of the permeated polymer layer and the top surface polymer layer, is not particularly limited, but is preferably 1.0 to 0.05 mm.

According to the present invention, as described above, by using a solution obtained by dissolving or dispersing 0.2 to 7.0% by weight of a coagulant and 0.1 to 7.0% by weight of an organic acid in a solvent as the coagulant solution for coagulating the polymer of the polymer latex, as shown in FIG. 1, a laminated body is obtained in which a polymer layer having a certain thickness is formed on the top surface of the fiber substrate and a portion of the polymer layer has permeated to a suitable thickness in the fiber substrate. Therefore, according to the present invention, the obtained laminated body has excellent flexibility and wear resistance and can be suitably used as a work glove, in particular as a protective glove such as for household, agricultural, fishery, and industrial use.

EXAMPLES

Hereinafter, the present invention will be described more specifically with reference to Examples and Comparative Examples, but the present invention is not limited to these examples. In the following, unless stated otherwise, the term "parts" is based on weight. The test or evaluation methods of the physical properties and characteristics are as follows.

Thickness of Top Surface Polymer Layer, Thickness of Permeated Polymer Layer, and Thickness of Entire Laminated Body A cross-section of the laminated polymer layer of a 12 cm palm portion from the tip of the middle finger in the laminated bodies produced in the Examples and Comparative Examples was observed using an optical microscope (VHX-200, manufactured by Keyence Corporation), and the thickness of the top surface polymer layer, the thickness of the permeated polymer layer, and the thickness of the entire laminated body were measured. The specific measurement method is now described with reference to FIG. 1. The thickness of the top surface polymer layer was determined by measuring the distance from the top surface of the fiber substrate to the top surface of the polymer layer at ten places, and calculating the number average value of the measurement results. The thickness of the permeated polymer layer was determined by measuring the distance from the top surface of the fiber substrate to the deepest portion of the permeated polymer at ten places, and calculating the number average value of the measurement results. The thickness of the entire laminated body was determined by measuring the distance from the top surface of the polymer layer to the bottom surface of the fiber substrate at ten places, and calculating the number average value of the measurement results.

Flexibility

Each glove produced in the Examples and Comparative Examples was worn by ten people and evaluated according to the following evaluation criteria.

5: Very soft
4: Soft
3: Slightly soft
2: Hard
1: Very hard

Wear Resistance

Wear resistance was evaluated by carrying out according to the method described in EN 388 using a Martindale Abrasion Tester (STM 633, manufactured by SATRA). Specifically, friction was repeatedly applied to the laminated bodies produced in the Examples and Comparative Examples while applying a predetermined load thereon, and the number of times of friction until breakage was obtained. This number was evaluated as a level from Level 0 to Level 4 according to the number of times of friction until breakage. The higher the level, the better the wear resistance.

LEVEL 4: Number of Revolutions: 8,000 revolutions
LEVEL 3: Number of Revolutions: 2,000 revolutions or more and less than 8,000 revolutions
LEVEL 2: Number of Revolutions: 500 revolutions or more and less than 2,000 revolutions
LEVEL 1: Number of Revolutions: 100 revolutions or more and less than 500 revolutions
LEVEL 0: Number of Revolutions: Less than 100 revolutions Pass Through The laminated bodies produced in the Examples and Comparative Examples were visually observed to confirm whether or not the polymer layer permeated into the fiber substrate had reached the bottom surface of the fiber substrate, and pass through was evaluated according to the following criteria.

No: Polymer layer did not reach the bottom surface of the fiber substrate.
Yes: Polymer layer reached the bottom surface of the fiber substrate.

Acetic Acid Odor

Ten subjects wore the laminated bodies produced in the examples and the comparative example and performed light keyboard entry work out for 1 hour. The number of people who felt discomfort due to acetic acid odor after 1 hour of work was counted, and acetic acid odor was evaluated according to the following criteria.

No: Number of people who felt uncomfortable was 0 people.
Yes: Number of people who felt uncomfortable was 1 or more.

Example 1

Preparation of Blending Agent Dispersion

In a ball mill, 1.0 parts of colloidal sulfur (manufactured by Hosoi Chemical Industry Co., Ltd.), 0.5 parts of a dispersant (product name "Demol N", manufactured by Kao Corporation), 0.0015 parts of a 5% aqueous solution of potassium hydroxide (manufactured by Wako Pure Chemical Industries, Ltd.), and 1.0 parts of water were pulverized and stirred for 48 hours to obtain a dispersion having a solid content concentration of 50% by weight.

Further, a dispersion using zinc dibutyldithiocarbamate (manufactured by Ouchi Shinko Chemical Industrial Co., Ltd., hereinafter, sometimes referred to as "ZnDBC") instead of the above colloidal sulfur was similarly prepared. Further, a dispersion using zinc oxide (manufactured by Seido Chemical Industry Co., Ltd.) in place of the above colloidal sulfur was also prepared in the same manner.

Preparation of Polymer Latex

A polymerization reactor was charged with 65 parts of 1,3-butadiene (hereinafter, sometimes referred to as "BD") as a conjugated diene monomer, 30 parts of acrylonitrile (hereinafter, sometimes referred to as "AN") as an α,β-ethylenically unsaturated nitrile monomer, 5 parts of methacrylic acid (hereinafter, sometimes referred to as "MAA") as an ethylenically unsaturated monocarboxylic acid monomer, 0.4 parts of t-dodecyl mercaptan, 132 parts of ion exchanged water, 3 parts of sodium dodecylbenzenesulfonate, 0.5 parts of a sodium salt of 0-naphthalenesulfonic acid formalin condensate, 0.3 parts of potassium persulfate, and 0.05 parts of sodium ethylenediaminetetraacetate. Polymerization was carried out while maintaining the polymerization temperature at 30 to 40° C. and a reaction was conducted until the reaction the polymerization conversion rate reached 94% to obtain a polymer latex.

Unreacted monomers were removed from the obtained polymer latex, and then the pH and the solid content concentration of the polymer latex were adjusted to obtain a latex for dip molding according to Example 1 having a solid content concentration of 40% and a pH of 8.

(Preparation of Latex Composition for Dip Molding)

An aqueous solution of 10% ammonia was added to the above-mentioned latex for dip molding to adjust the pH to 9.5, and an aqueous dispersion of the respective blending agents was added to 100 parts of the copolymer in the latex for dip molding such that, in terms of the solid content of each blending agent, 1.0 parts of colloidal sulfur (added as the above-mentioned sulfur dispersion), 0.5 parts of ZnDBC, and 2.0 parts of zinc oxide were added. Note that during the addition of the aqueous dispersion of the respective blending agents, a predetermined amount was slowly added while stirring the latex for dip molding. After uniformly mixing the additives, Aron (manufactured by Toagosei Co., Ltd.) was added as a viscosity modifier to adjust the viscosity of the composition to 3,000 mPa·s, whereby a latex composition for dip molding was obtained.

Preparation of Coagulant Solution

A methanol solution prepared by dissolving 1.0% by weight of calcium nitrate as a coagulant and 3.0% by weight of acetic acid as an organic acid in methanol was prepared as a coagulant solution.

Production of Laminated Body (Protective Glove)

First, the above latex composition for dip molding was aged (also referred to as prevulcanized) at a temperature of 30° C. for 48 hours. Next, a ceramic glove mold covered with a glove-shaped fiber substrate (material: nylon, linear density: 300 denier, gauge number: 13 gauge, thickness: 0.8 mm) was dipped in the above coagulant solution for 5 seconds. The ceramic glove mold was pulled from the coagulant solution, and then dried at a temperature of 30° C. for 1 minute. Next, the ceramic glove mold was dipped in the above latex composition for dip molding for 5 seconds, pulled from the latex composition for dip molding, dried at a temperature of 30° C. for 30 minutes, and then dried at a temperature of 70° C. for 10 minutes to form a polymer layer on the fiber substrate. Next, the ceramic glove mold having the polymer layer formed thereon was dipped in warm water of 60° C. for 90 seconds to elute water-soluble impurities from the polymer layer, then dried at a temperature of 30° C. for 10 minutes. The polymer in the polymer layer was then crosslinked by performing a heat treatment at a temperature of 125° C. for 30 minutes. Next, a laminated body (protective glove) was obtained by peeling the fiber substrate having the polymer layer formed thereon from the ceramic glove mold. The thickness of the top surface polymer layer, the thickness of the permeated polymer layer, and the thickness of the entire laminated body, flexibility, wear resistance, pass through, acetic acid odor of the obtained laminated body were evaluated according to the methods described above. The results are shown in Table 1. Note that in Table 1, the total value of the thickness of the top surface polymer layer and the thickness of the permeated polymer layer is shown as the thickness of the entire polymer layer.

Examples 2 to 5

Laminated bodies (protective gloves) were obtained and evaluated in the same manner as in Example 1, except that in place of the coagulant solution used in Example 1, a methanol solution containing 0.2% by weight of calcium nitrate and 3.0% by weight of acetic acid (Example 2), a methanol solution containing 7.0% by weight of calcium nitrate and 3.0% by weight of acetic acid (Example 3), a methanol solution containing 1.0% by weight of calcium nitrate and 0.1% by weight of acetic acid (Example 4), and a methanol solution containing of 1.0% by weight of calcium nitrate and 7.0% of acetic acid (Example 5) were each prepared and used as the coagulant solution. The results are shown in Table 1.

Example 6

A laminated body (protective glove) was obtained and evaluated in the same manner as in Example 1, except that in place of the coagulant solution used in Example 1, a methanol solution containing 4.8% by weight of calcium nitrate and 3.0% by weight of acetic acid was used as the coagulant solution. The results are shown in Table 1.

Comparative Examples 1 to 5

Laminated bodies (protective gloves) were obtained and evaluated in the same manner as in Example 1, except that in place of the coagulant solution used in Example 1, a methanol solution in which only 1.0% by weight of calcium nitrate was dissolved (Comparative Example 1), a methanol solution in which only 3.0% by weight of acetic acid was dissolved (Comparative Example 2), a methanol solution in which only 0.1% by weight of calcium nitrate was dissolved (Comparative Example 3), a methanol solution in which only 10.0% by weight of calcium nitrate was dissolved (Comparative Example 4), and a methanol solution containing 10.0% by weight of calcium nitrate and 8.0% by weight of acetic acid (Comparative Example 5) were each prepared and used as the coagulant solution. The results are shown in Table 1.

TABLE 1

| | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| Composition of Coagulant Solution | | | | | | | | | | | | |
| Coagulant (Calcium Nitrate) | (% by weight) | 1.0 | 0.2 | 7.0 | 1.0 | 1.0 | 4.8 | 1.0 | 0.0 | 0.1 | 10.0 | 10.0 |
| Organic Acid (Acetic Acid) | (% by weight) | 3.0 | 3.0 | 3.0 | 0.1 | 7.0 | 3.0 | 0.0 | 3.0 | 0.0 | 0.0 | 8.0 |
| Protective Glove | | | | | | | | | | | | |
| Thickness of Entire Laminated Body | (mm) | 0.94 | 0.92 | 1.10 | 0.96 | 0.94 | 1.04 | 0.99 | 1.02 | 0.82 | 1.25 | 1.00 |
| Thickness of Entire Polymer Layer | (mm) | 0.43 | 0.55 | 0.50 | 0.48 | 0.44 | 0.47 | 0.57 | 0.72 | 0.71 | 0.55 | 0.36 |
| Thickness of Permeated Polymer Layer | (mm) | 0.21 | 0.35 | 0.12 | 0.24 | 0.22 | 0.15 | 0.29 | 0.42 | 0.61 | 0.02 | 0.08 |
| Thickness of Top Surface Polymer Layer | (mm) | 0.22 | 0.20 | 0.38 | 0.24 | 0.22 | 0.32 | 0.28 | 0.30 | 0.10 | 0.53 | 0.28 |

TABLE 1-continued

|  |  | Example | | | | | | Comparative Example | | | | |
| --- | --- | --- | --- | --- | --- | --- | --- | --- | --- | --- | --- | --- |
|  |  | 1 | 2 | 3 | 4 | 5 | 6 | 1 | 2 | 3 | 4 | 5 |
| Evaluation |  |  |  |  |  |  |  |  |  |  |  |  |
| Flexibility |  | 5 | 4 | 4 | 4 | 5 | 4 | 2 | 1 | 1 | 3 | 4 |
| Wear Resistance |  |  |  |  |  |  |  |  |  |  |  |  |
| Number of Revolutions | (rpm) | 8,000 | 8,000 | 5,000 | 8,000 | 6,000 | 5,000 | 8,000 | 8,000 | 2,000 | 500 | 500 |
| LEVEL |  | 4 | 4 | 3 | 4 | 3 | 3 | 4 | 4 | 3 | 1 | 2 |
| Pass Through |  | No | No | No | No | No | No | No | Yes | Yes | No | No |
| Acetic Acid Odor |  | No | No | No | No | No | No | No | No | No | No | Yes |

As shown in Table 1, all of the laminated bodies obtained using as the coagulant solution for coagulating the polymer in the polymer latex (latex composition for dip molding) a solution obtained by dissolving or dispersing 0.2 to 7.0% by weight of a coagulant and 0.1 to 7.0% by weight of an organic acid in a solvent exhibited excellent flexibility and wear resistance, and moreover, pass through and acetic acid odor were not confirmed (Examples 1 to 6).

On the other hand, the laminated body obtained using a coagulant solution in which, despite having a coagulant content ratio in the above-mentioned range, did not contain an organic acid, exhibited poor flexibility (Comparative Example 1).

The laminated body obtained using a coagulant solution in which, despite having an organic acid content ratio in the above range, did not contain a coagulant, exhibited poor flexibility and pass through occurred (Comparative Example 2).

The laminated body obtained using a coagulant solution in which the coagulant content ratio was too small and did not contain an organic acid exhibited poor flexibility and pass through occurred (Comparative Example 3).

The laminated body obtained using a coagulant solution in which the coagulant content ratio was too large and did not contain an organic acid exhibited poor flexibility and wear resistance (Comparative Example 4).

The laminated body obtained using a coagulant solution in which the coagulant content ratio and the organic acid content ratio were both too large exhibited poor wear resistance and acetic acid odor was confirmed (Comparative Example 5).

The invention claimed is:

1. A method of producing a laminated body, the method comprising:
    a coagulant solution deposition step of depositing a coagulant solution on a fiber substrate; and
    a coagulation step of forming a polymer layer on the fiber substrate by bringing a polymer latex into contact with the fiber substrate having the coagulant solution deposited thereon to cause a polymer to coagulate,
    wherein as the coagulant solution, a solution obtained by dissolving or dispersing 0.2 to 1.0% by weight of a metal salt as a coagulant and 0.1 to 3.0% by weight of an organic acid in a solvent is used, and the metal salt is calcium nitrate and the organic acid is acetic acid.

2. The method of producing a laminated body according to claim 1, wherein a polymer constituting the polymer latex is a nitrile rubber.

3. The method of producing a laminated body according to claim 1, wherein in the coagulation step, the polymer layer is formed so that a permeated polymer layer, which, of the polymer layer, is a portion having permeated into the fiber substrate, has a thickness of 0.05 to 0.6 mm.

4. The method of producing a laminated body according to claim 1, wherein in the coagulation step, the polymer layer is formed so that a top surface polymer layer, which, of the polymer layer, is a portion having not permeated into the fiber substrate, has a thickness of 0.05 to 0.6 mm.

5. A method of producing a protective glove using a laminated body obtained by the method of producing a laminated body according to claim 1.

\* \* \* \* \*